United States Patent
Pelloie et al.

(10) Patent No.: US 8,924,766 B2
(45) Date of Patent: Dec. 30, 2014

(54) ANALYSING TIMING PATHS FOR CIRCUITS FORMED OF STANDARD CELLS

(75) Inventors: Jean Luc Pelloie, Moirans (FR); Yves Thomas Laplanche, Crolles (FR)

(73) Assignee: ARM Limited, Cambridge (GB)

( * ) Notice: Subject to any disclaimer, the term of this patent is extended or adjusted under 35 U.S.C. 154(b) by 323 days.

(21) Appl. No.: 13/406,796

(22) Filed: Feb. 28, 2012

(65) Prior Publication Data

US 2013/0227330 A1   Aug. 29, 2013

(51) Int. Cl.
*G06F 1/04*   (2006.01)

(52) U.S. Cl.
USPC ........... 713/503; 713/400; 713/401; 713/500; 716/108; 716/113; 702/57; 702/79

(58) Field of Classification Search
USPC ................. 713/400, 401, 500, 503, 108, 113; 702/57, 79
See application file for complete search history.

(56) References Cited

U.S. PATENT DOCUMENTS

| | | | | |
|---|---|---|---|---|
| 5,796,985 | A * | 8/1998 | O'Brien et al. | 716/113 |
| 7,594,209 | B2 * | 9/2009 | Abbaspour et al. | 716/108 |
| 7,761,275 | B2 * | 7/2010 | Chopra et al. | 703/14 |
| 7,940,034 | B2 * | 5/2011 | Pelz et al. | 323/284 |
| 8,516,420 | B1 * | 8/2013 | Kariat et al. | 716/108 |
| 8,543,954 | B1 * | 9/2013 | Keller et al. | 716/115 |

* cited by examiner

*Primary Examiner* — Thuan Du
(74) *Attorney, Agent, or Firm* — Nixon & Vanderhye P.C.

(57) ABSTRACT

A method of performing and correcting a timing analysis performed by a data processing apparatus on a circuit formed of a plurality of cells to account for the reverse Miller effect. The timing analysis steps includes identifying cells on and in parallel with a signal path that are driven by a same signal and determining an output transition time and a delay using the characterization data for the cell. The correcting steps includes providing further characterization data for some of the cells; correcting the output transition time for some of the cells by increasing the output transition time by an amount dependent upon the Miller capacitance for the cell and using the correction to the output transition time to correct an input transition time for a next cell; and calculating a time taken for a data signal to travel along the signal path from the delay times.

26 Claims, 10 Drawing Sheets

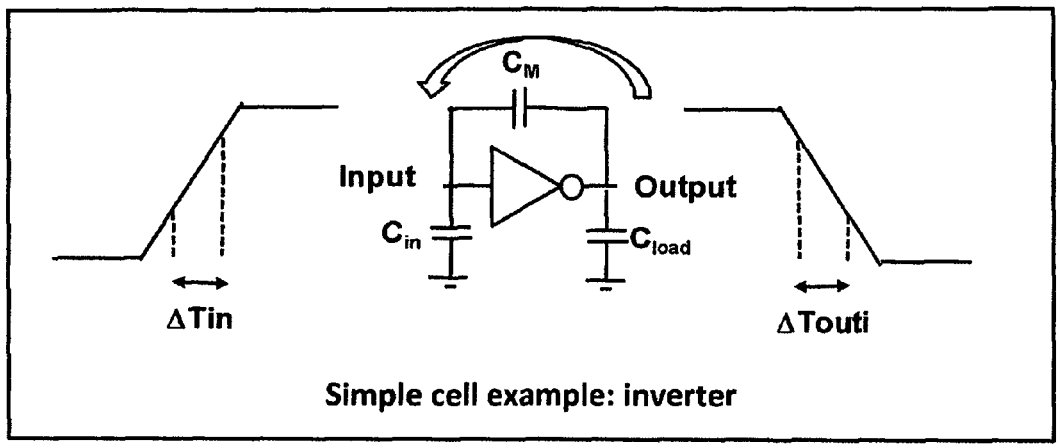
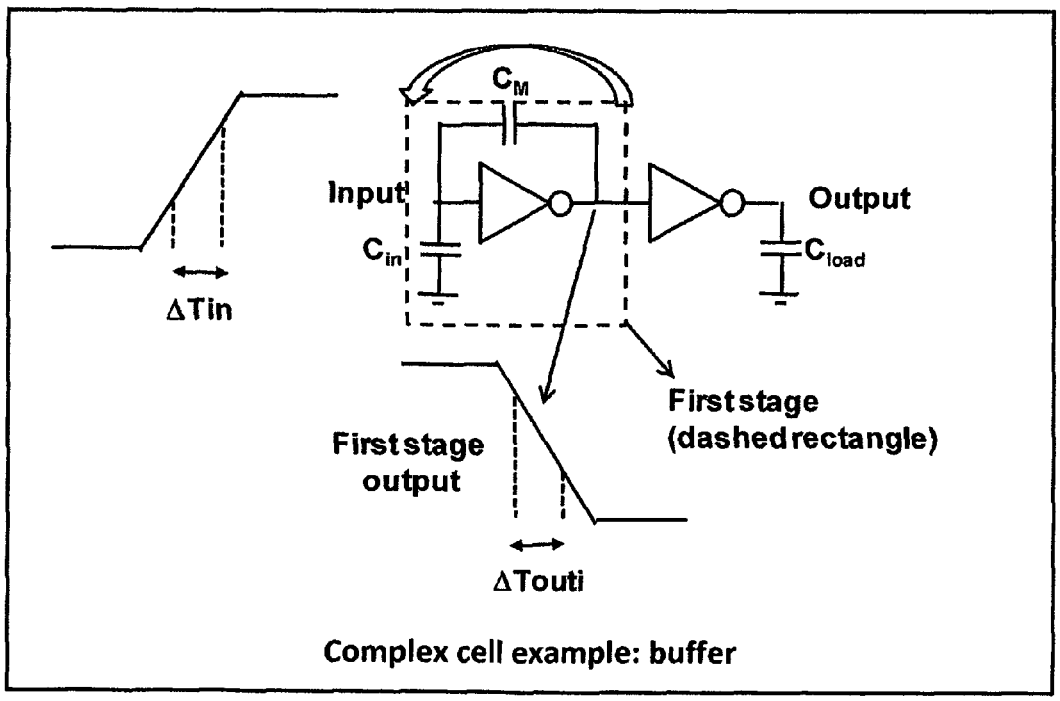
FIGURE 1

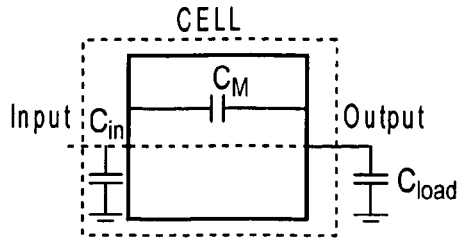

```
         pin(A)  (
         fall_capacitance        : 0.428247 ;
         rise_capacitance        : 0.461533 ;
         Miller_fall_capacitance : 0.21245 ;
Input    Miller_rise_capacitance : 0.23684 ;
         Fall_threshold_voltage_ratio : 0.25 ;
         Rise_threshold_voltage_ratio : 0.31 ;

pin(Y) { cell_falling (tmg_ntin_oload_7x7) {
         index_1("0.3, 4.422, 18.894, 46.531, 89.587, 150, 400") ; Input transition time values
         index_2("0.2, 0.530588, 1.69103, 3.90705, 7.3595, 12.2037, 18.578"); Output load values
         values ("37.3074, 39.9806, 47.45, 59.7194, 78.1627, 103.715, 137.368", \
Fall     "39.5679, 42.2482, 49.7818, 62.0759, 80.4241, 105.977, 139.611", \
delay    "47.465, 50.143, 57.7162, 70.0728, 88.4088, 114.043, 147.626", \
         "62.953, 65.6505, 73.226, 85.7078, 104.129, 129.705, 163.289", \
         "87.9842, 90.6367, 98.2477, 110.703, 129.135, 154.725, 188.235", \
         "123.221, 125.957, 133.612, 146.029, 164.4, 190.071, 223.573", \
         "249.043, 253.164, 263.38, 277.385, 296.074, 321.311, 354.417");} cell_rise (tmg_ntin_oload_7x7) {
         index_1("0.3, 4.422, 18.894, 46.531, 89.587, 150, 400");
         index_2("0.2, 0.530588, 1.69103, 3.90705, 7.3595, 12.2037, 18.578");
Rise     values ("35.4075, 38.6589, 48.7212, 66.8018, 94.568, 133.533, 184.67", \
delay    "37.5837, 40.8621, 51.012, 69.0059, 96.8337, 135.796, 187.045", \
         "45.2755, 48.5383, 58.7192, 76.8758, 104.682, 143.602, 194.792", \
         "60.2213, 63.44, 73.5933, 91.8193, 119.707, 158.642, 209.943", \
         "83.9878, 87.1998, 97.3294, 115.524, 143.482, 182.454, 233.766", \
         "115.504, 118.771, 128.829, 146.904, 174.753, 213.768, 265.125", \
         "221.376, 225.281, 236.184, 254.383, 281.948, 320.602, 371.409");} fall_transition (tmg_ntin_oload_7x7) {
         index_1("0.3, 4.422, 18.894, 46.531, 89.587, 150, 400") ;
Fall     index_2("0.2, 0.530588, 1.69103, 3.90705, 7.3595, 12.2037, 18.578");
transition values ("17.7233, 20.9219, 32.0828, 54.0265, 89.366, 139.895, 206.819", \
time     "17.7163, 20.8809, 32.0619, 53.9694, 89.3912, 139.92, 206.799", \
         "17.7775, 20.9019, 32.0298, 54.0049, 89.3795, 139.916, 206.89", \
         "17.7411, 20.9506, 32.0952, 53.9806, 89.3911, 139.93, 206.834", \
         "17.8473, 21.009, 32.1624, 54.0114, 89.4005, 139.926, 206.878", \
         "19.5244, 22.3554, 32.7723, 54.2856, 89.4679, 139.944, 206.757", \
         "35.6412, 38.2355, 47.0546, 64.5797, 95.5552, 142.739, 208.064");
         }
         rise_transition (tmg_ntin_oload_7x7) {
         index_1("0.3, 4.422, 18.894, 46.531, 89.587, 150, 400") ;
         index_2("0.2, 0.530588, 1.69103, 3.90705, 7.3595, 12.2037, 18.578");
Rise     values ("20.0377, 25.2095, 44.3335, 81.9959, 141.535, 225.456, 336.059", \
transition "19.9687, 252066, 44.3287, 82.0561, 141.671, 225.431, 336.095", \
time     "19.9918, 25.1989, 44.3019, 82.025, 141.667, 225.595, 335.748", \
         "19.9822, 25.2394, 44.3151, 82.0084, 141.653, 225.602, 336.154", \
         "20.0653, 25.3044, 44.3816, 82.0981, 141.642, 225.615, 336.008", \
         "22.5581, 27.1932, 45.2269, 82.2536, 141.661, 225.356, 336.141", \
         "36.411, 40.0839, 55.2441, 88.7398, 145.383, 227.497, 337.217");
```

FIG. 6

ANALYSING TIMING PATHS FOR CIRCUITS FORMED OF STANDARD CELLS

TECHNICAL FIELD

The technical field relates to the field of analysing circuits to determine the timing of signals passing through the circuits.

BACKGROUND

As integrated circuits become more complex, it is becoming common to analyse them using simulation programs during the design phase rather than building test circuits. One way of analysing a circuit is to use a spice simulation wherein the circuit is simulated and its operation verified. A spice simulation will simulate the current through each element and the charge at each node and as such provides an accurate simulation but is computationally expensive, prohibitively so for large circuits.

Complex circuits are now commonly built from standard cells that perform particular functions within a circuit and are designed to fit within certain standard placement areas. These cells are coupled together to form the complex circuit. Each of these standard cells are supplied with a characterisation file, which may be in the form of a liberty file, and provides characteristic information about the cell that has been derived from a spice simulation of the cell. This file will have lookup tables that indicate the delay time or the output transition time of the standard cell for different input transition times and different loadings.

A standard cell may perform a more or less complex logical function. Simple cells (examples are inverter, NAND, NOR) are formed of a single inverting stage between the input, or one of the inputs, (NAND and NOR have several inputs) and the output. Complex cells are formed by stacking several inverting stages between the input, or one of the inputs, and the output (examples are AND, OR, latch, flip-flop).

When a circuit is designed using standard cells, it can be analysed in a computationally efficient way by using static timing analysis that makes use of these liberty files. Thus, signal paths within the circuit are identified and the loading on a first cell in the signal path is determined from the cells connected to it, and then using the input signal to determine the input transition time the delay time and the output transition time are determined from the lookup tables. The output transition time can then be used as the input transition time for the next cell in the path and the delay and the output transition time can be determined for this cell. In this way a timing delay for a path can be determined.

One problem with static timing analysis is that the characterisation files for the cells are the characteristics of the cells that have been determined for the cell with particular predetermined loadings and not for the cell when it is in situ in the circuit currently being analysed. Thus, although the cells may have had similar capacitive loads attached to them during simulation, these loads were not the devices of the circuit through which data signals are actually being sent. Thus, the simulation does not have taken account of the reverse Miller effect. The reverse Miller effect is a capacitive coupling effect, where an output transition of a CMOS stage will slow down the input transition due to the capacitive coupling between the two. The Miller capacitance of a cell is the capacitance between the input and the output including the CMOS transistors and additional parasitic capacitances.

FIG. 1 shows two example cells, a simple cell having an inverter circuit and a more complex cell that is formed of two inverter stages. In the simple cell and the first inverting stage of the more complex cell the output signal is switching in the opposite direction to the input signal, the input signal is reduced in magnitude by the output signal through the capacitive coupling between input and output. The consequence of this is that the input signal switches more slowly and the actual delay of the cell is larger than would be the case without the reverse Miller effect.

A problem with static timing analysis is that as the cells are characterised as standard cells with hypothetical loads the reverse Miller effect due to other components in the circuit affecting the input signal cannot be allowed for as the actual arrangement of the final circuit is not known at the time that the characterisation files are generated.

One way of addressing this problem has been to identify, using static timing analysis, which paths are the critical paths within a complex circuit and then just these paths can be analysed using spice simulation to check the accuracy of the static timing analysis for this subset of important paths.

It would be desirable to be able to analyse complex circuits accurately without too large a computational burden.

SUMMARY

A first aspect provides a method of correcting a timing analysis performed by a data processing apparatus on a circuit formed of a plurality of cells to account for the reverse Miller effect, said data processing apparatus having access to timing characterisation data that provides timing characteristics for each of said plurality of cells, said timing characterisation data indicating output transition times and delay times for a signal passing through said cell in dependence upon transition times of said signal and a loading on said cell, wherein said timing analysis comprises:

for a signal path:

identifying cells on said signal path and cells in parallel to said cells on said signal path that are driven by a same signal, and for each cell on said signal path, determining from an input transition time and a load on said cell, an output transition time and a delay using said characterisation data for said cell, an output transition time calculated for a first cell on said signal path being used as a basis for an input transition time for a next cell on said signal path; wherein said correcting steps comprise:

providing further characterisation data for at least some of said cells, said further characterisation data including a Miller capacitance of at least a portion of said cell;

correcting said determined output transition time for said at least some of said cells by increasing said output transition time by an amount dependent upon said Miller capacitance for said cell and for said at least some of said cells that are in parallel to said cell and are driven by a same signal;

using said correction to said output transition time to correct an input transition time for a next cell when calculating said delay time and said output transition time for said next cell;

calculating a time taken for a data signal to travel along said signal path from said delay times determined using said corrected output transition times.

The technology described herein recognises that although static timing analysis cannot account for increases in timing due to the reverse Miller effect, the Miller capacitance of a cell or a portion of a cell can be measured for a standard cell when it is not connected in a circuit and if this information is collected for at least some cells in a circuit, then a correction to the output transition time for these cells that has been calculated using static timing analysis can be performed. This corrected output transition time can then be used as the basis for the input transition time of the next cell. In this regard it can either be used directly as the input transition time or it can be modified slightly to account for the effect of interconnections between the cells. In this way a correction can be made that will ripple through the circuit and a more accurate result can be obtained that takes into account the reverse Miller effect, without too much additional computational cost.

In some embodiments, said step of correcting said determined output transition time for said cell comprises correcting said input transition time by an amount dependent upon said Miller capacitance for said cell and for said at least some of said cells that are in parallel to said cell and are driven by a same signal and using said corrected input transition time to determine a corrected output transition time and a corrected delay time using said characterisation data for said cell.

The Miller capacitance has an effect on the input transition as can be seen from FIG. 1 and thus, it can be used to provide a corrected input transition time that can then be used to derive a corrected delay and output transition time using the characterisation data for the cell.

In some embodiments said plurality of cells comprise at least one simple cell comprising a single inverting stage and at least one complex cell with multiple inverting stages, said Miller capacitance being said Miller capacitance of a first inverting stage of said cells.

Complex cells with multiple inverting stages will have the Miller effect of the later stages in the cell accounted for in the characterisation data and thus, it is the first stage that needs to be corrected for Therefore the Miller capacitance of the first inverting stage is the value that is used in the correction. In the simple cells it is simply the Miller capacitance of the cell, which is the Miller capacitance of the first (and only) inverting stage that is used.

In some embodiments said method further comprises providing further characterisation data for said at least some of said cells, said further characterisation data comprising a value indicative of a threshold voltage at which a predetermined output starts to transition; wherein said amount that said output transition time is increased by is dependent upon said Miller capacitance for said cell and for said at least some of said cells that are in parallel to said cell and are driven by a same signal and for a subset of said at least some of said cells said amount is also dependent upon said value indicative of said threshold voltage.

Although for some cells the amount that the output transition time is increased by may be dependent on the Miller capacitance in others it is dependent upon both the Miller capacitance and the value indicative of a threshold voltage at which a predetermined output starts to transition. The latter cells are the cells where the predetermined output transition is slower and completes after the input transition. For complex cells (more than one inverting stage between the input and the output), the reverse Miller effect is accounted for during the characterisation for all stages but the first stage. In the case of complex cells, the predetermined output transition to consider for the threshold voltage is the transition occurring at the output of the first inverting stage, similarly the Miller capacitance is the Miller capacitance of the first inverting stage. For simple cells the predetermined output is the output of the cell.

In some embodiments, the method of correcting the timing analysis comprises the further steps of: determining for said at least some of said cells that are in said signal path: whether, for said each of said at least some of said cells in said signal path and said at least some of said cells in parallel to said cell and driven by a same signal said predetermined output transition completes before said input transition, and dividing said at least some of said cells into two sets a first set comprising cells where said predetermined output transition completes before said input transition, and a second set comprising cells where said predetermined output transition completes after said input transition; determining a contribution to said correction of said output transition time differently for said first set and said second set, said contribution from said first set depending on said Miller capacitance for said cells and said contribution from said second set depending on said Miller capacitance for said cells and said value indicative of said threshold voltage.

The amount that the output transition time is affected by the reverse Miller effect depends on how quickly the cell's or the first stage's output transitions. If it transitions more quickly than the input signal such that the output transition finishes before the input transition has finished then its effect will be larger than if the output transition transitions more slowly. Thus, in some embodiments the cells are divided into sets depending on whether the output transition is quicker than the input transition and the contribution to the time correction for each cell is calculated differently depending on which set they are within. In this regard, the contribution from the cells in the set where the output transition is quicker is dependent on the Miller capacitance of the cells and the contribution from the second set of cells where the output transition is slower is dependent on both the Miller capacitance and the value indicative of the threshold voltage at which the cells' output starts to transition.

In some embodiments, said correction for said first set of cells is dependent upon a ratio of a sum of said Miller capacitance for said cell and for said cells in parallel to said cell and driven by a same signal to a total capacitance of said circuit seen at an input to said cell.

The correction for the first set of cells may be dependent upon the Miller to capacitances for the cells driven by the input signal as a ratio to the total capacitance of the circuit seen at the input to the cell.

In some embodiments, said correction for said second set of cells is dependent upon a ratio of a sum of said Miller capacitance for said cell and for said cells in parallel to said cell driven by a same signal to a total capacitance of said circuit seen at an input to said cell and driven by a same signal and to a difference between said transition time threshold of said signal and said value indicative of said threshold voltage at which said output starts to transition.

The correction for the second set of cells, that is the cells where the output transitions more slowly than the input is dependent not only upon the ratio of the sum of the Miller capacitances of the driven cells to the total capacitance but also to the value indicative of a threshold voltage at which the cells' or first stages' of complex cells output starts to transition. This value will effect when the output starts to transition and therefore at which point this has an effect on the input signal and is included in the correction for those cells whose output transitions faster than their input transitions.

In some embodiments, said characterisation data for each cell comprises a file comprising delay and output transition time lookup tables for rising and for falling signals and for said at least some cells further comprises said Miller capacitance for said rising and said falling signals and said value indicative of a threshold voltage at which an output starts to transition.

The characterisation data for the cells is generally supplied in a file which the designers of the cells supply with the cells to the people building the circuit. These files can then be used in static timing analysis to determine the properties of the circuits. In embodiments of the present invention where a correction to the output transition time is to be made to account for the reverse Miller effect then in addition to the lookup tables for the output transition times and the delays, the files will also contain the Miller capacitances for both a rising and a falling signal, a value indicative of a threshold voltage at which an output starts to transition on both a rising and falling transition. The provision of this additional data allows a correction for the reverse Miller effect to be performed on the output transition time that is selected from the lookup tables and this corrected value can then be used as a basis for the input transition time for the next cell in the signal path.

In some embodiments said characterisation data for each cell comprises a file comprising delay and output transition time lookup tables for rising and for falling signals at an output of said cell and for said simple cells further comprises said Miller capacitance for said cell for said rising and said falling signals and said value indicative of a threshold voltage at which a cell's output starts to transition, and for said at least some cells, where said at least some cells are complex cells further comprises said Miller capacitance for said first inverting stage of said complex cell for said rising and said falling signals and said value indicative of a threshold voltage at which a first inverting stage's output starts to transition and output transition time lookup tables for said first inverting stage.

Where the cell is a complex cell the correction of the Miller effect needs to be performed for the first inverting stage and therefore the characterisation data for this complex cell needs to have information for the first inverting stage and therefore comprises the output transition time lookup tables for the first inverting stage, and the Miller capacitance of the first inverting stage, and the value indicative of the threshold, value for the first inverting stage.

A second aspect of the present invention provides a computer program which when executed on a data processing apparatus controls said data processing apparatus to perform a method according to a first aspect of the present invention.

The correction of the timing analysis may be performed by a data processing apparatus such as a computer in response to a computer program that the apparatus is executing.

A third aspect of the present invention provides a method of performing a timing analysis on a processing apparatus analysing a circuit formed of a plurality of cells, said processing apparatus having access to timing characterisation data that provides timing characteristics for each of said plurality of cells, said timing characterisation data including timings for signals passing through said cell in dependence upon transition times of an input signal and a loading on said cell, said timing characterisation data for at least some of said cells further comprising a Miller capacitance for said cell, wherein said method comprises the steps of:

for a signal path:
identifying cells on said signal path and cells in parallel to said cells on said signal path that are driven by a same signal, and for each of said cells on said signal path:
determining from an input transition time, and a load on said cell, a first output transition time using data from said characterisation data for said cell;
and for said at least some of said cells on said signal path for which Miller capacitance data is available correcting said input transition time for said cell by increasing said input transition time by an amount dependent upon said Miller capacitance of said cell and said at least some of said cells that are in parallel to said cell and are driven by a same signal;
using said correction to said input transition time to determine a delay time and a corrected output transition time from said characterisation data, said corrected output transition time being used as a basis for an input transition time for a next cell on said signal path;
calculating a time taken for a data signal to travel along said signal path from said delay times.

Although the present technique can be used to correct a conventional timing analysis, it can also be used to perform the timing analysis of a circuit and in this case characterisation data provided for at least some of the cells comprise the Miller capacitance, and the input transition time that is calculated for these cells is corrected using the Miller capacitance data for the cell and for similar cells that are in parallel with the cell in question and that are driven by the same signal, and this corrected input transition time is then used to determine a delay and output transition time for the cell. The output transition time serving as a basis for the input transition time of the next cell such that the correction ripples through the timing calculation and a more accurate timing calculation is performed than would be the case if such a correction were not made.

In some embodiments said plurality of cells comprise at least one simple cell with a single inverting stage, said first output transition time for said at least one simple cell being a time that it takes for a signal measured at an output of said cell to transition between two predetermined percentages of its maximum value, said input transition time for said next cell being based on said corrected output transition time, while in other embodiments said plurality of cells further comprise at least one complex cell with multiple inverting stages, said first output transition time for said at least one complex cell being a time that it takes for a signal measured at an output of a first inverting stage of said complex cell to transition between two predetermined percentages of its maximum value.

As noted previously where the cell is a complex cell the correction for the Miller effect is made for the first inverting stage, this generates a corrected input signal which is used to derive a corrected output transition time and delay for the whole cell.

A fourth aspect of the present invention provides a computer program which when executed on a data processing apparatus controls said data processing apparatus to perform a method according to a second aspect of the invention.

A fifth aspect of the present invention provides a method of generating a timing characterisation file for a standard cell comprising the steps of:

analysing said standard cell using a processing apparatus to determine:
determining changes in output transition times and delay times with respect to predetermined changes in loading and predetermined changes in transition input times for a rising and a falling signal at the output of the cell;
storing said changes in output transition times and delay times against said predetermined loading and transition input times for said rising and said falling signals;
determining a Miller capacitance of at least a portion of said cell for a rising and a falling signal;
determining a ratio of a starting point of an output transition to a threshold voltage of the cell for a rising and a falling signal; and
generating a timing characterisation file for said standard cell comprising said delays, said output transition times, said Miller capacitances and said threshold voltage ratios for said rising and said falling signals.

It is known to provide timing characterisation files when generating a standard cell so that people designing circuits using standard cells can perform timing analysis on the circuit using the data from the timing characterisation file supplied with the standard cells. Often these characterisation files include this data as lookup tables for output transition times and delay times with respect to predetermined changes in loading and input transition times for both a rising and a falling signal for each input to the cell. The technology described herein recognises that the accuracy of timing analysis performed using this data is affected by the reverse Miller effect between cells in the circuit. It also recognises that the Miller capacitance of at least a portion of a cell can be determined from the cell when it is not in the circuit and that this information could be used in a static timing analysis to perform a correction in the output transition time that is calculated for the cell. Thus, in addition to providing the output transition times and delay data, a timing characterisation file is generated that also includes the Miller capacitance for a rising and falling signal, a ratio of a starting point of an output transition to a threshold voltage of the cell for a rising and a falling signal. Thus, a timing characterisation file that can be used in a static timing analysis to provide a timing analysis that accounts for the reversed Miller effect is generated.

In some embodiments, said standard cell comprises a complex cell with multiple inverting stages, said method further comprising a step of determining changes in output transition times with respect to predetermined changes in loading and predetermined changes in transition input times for a rising and a falling signal at an output of a first inverting stage of said complex cell; and storing said changes in output transition times against said predetermined loading and transition input times for said rising and said falling signals.

Where the cell is a complex cell with multiple inverting stages then the characterisation data will account for the Miller effect of all but the first inverting stage. In such a case in order to correct for the Miller effect of this first inverting stage additional data is required in the characterisation timing file regarding the output transition times at the output of the first inverting stage. Furthermore the Miller capacitance used in the correction will be the Miller capacitance of the first inverting stage.

In some embodiments, said timing characterisation file is a liberty file for use in static timing analysis of a circuit that includes said standard cell and said output transition times and delay times are stored in lookup tables within said liberty file.

Timing characterisation files are often generated in the form of liberty files that are used during static timing analysis of a circuit. In embodiments of the present invention, the timing characterisation file generated is in the form of a liberty file with the standard lookup tables for output transition times and delay times, but further includes the Miller capacitance, the threshold voltage ratios and the first stage output transition times for complex cells (additional lookup tables) required for performing a correction to the estimated timing signal to account for the reverse Miller effect. This additional data may be included within the file itself or as a comment associated with the file.

A sixth aspect of the present invention provides a timing characterisation file for a standard cell generated according to the method of the fifth aspect of the present invention, and comprising said output transition times and delay times as a function of input transition times and loads on said standard cell and Miller capacitances, threshold voltage ratios and complex cell first stage output transition times in the case of a complex cell for a falling and a rising signal input to said standard cell.

A seventh aspect of the present invention provides a timing characterisation file of a standard cell for use in a static timing analysis for a circuit including said standard cell according to a second aspect of the present invention, said timing characterisation file comprises data indicating how output transition times and delay times vary with input transition times and loads on said standard cell and Miller capacitances and ratios of a starting point of an output transition to a threshold voltage and complex cell first stage output transition times for a falling and a rising signal input to said standard cell.

A timing characterisation file with Miller capacitances and output transition threshold voltage ratio values and complex cell first stage output transition times in a complex cell allow static timing analysis to be performed that can correct for the reverse Miller effect that arises due to the output signals of other components within the circuit interfering with the input signal and degrading it. This effect cannot be corrected for using conventional timing characterisation files as they do not contain all the necessary information.

The above, and other objects, features and advantages of this invention will be apparent from the following detailed description of illustrative embodiments which is to be read in connection with the accompanying drawings.

BRIEF DESCRIPTION OF TILE DRAWINGS

FIG. 1 schematically shows how the Miller capacitance of an inverter couples the input and output signals;

FIG. 2 schematically shows how the output signal transitioning can affect the transition of the input signal;

FIG. 3 schematically shows a section of a circuit and how the Miller capacitances of the cells to which the signal is sent affect the transition of the signal;

FIGS. 4A and 4B schematically shows how the Miller capacitance is derived for a cell;

FIG. 5 schematically shows how the threshold voltage ratios are derived;

FIG. 6 shows schematically a cell and the data that would be provided in its characterisation file;

DESCRIPTION OF THE EXAMPLE NON-LIMITING EMBODIMENTS

Figure 2:
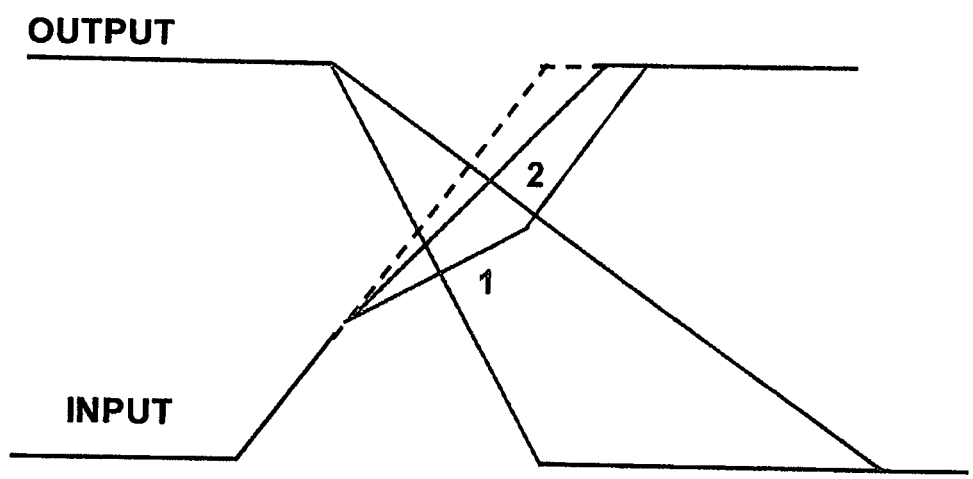

As noted above the Miller capacitance of a simple cell or the first inverting stage of a complex cell such as that shown in FIG. 1 causes the output transition of the cell or stage to affect the input transition by slowing it down, which in turn slows down the output transition. The effect of this is illustrated in FIG. 2, where two examples are shown, in the first the output switches more quickly than the input and finishes before the input transition has finished, while in the second it switches more slowly.

For the sake of simplicity the waveforms are shown using piecewise linear models. The dashed line corresponds to the input signal waveform without the reverse Miller effect. In the first example where the output switches faster than the input, the input transition is degraded during the output transition and then resumes to its initial transition rate once the output is stable.

In the second case the output transition takes longer than the input transition, the input transition is therefore degraded from the point that the output transition starts until the input transition has completed. In both cases the output does not start to switch until the input has reached the threshold voltage of the devices in the cell.

From this diagram it is clear that for the case of an inverting cell or stage where the output transition is in the opposite direction to the input transition the Miller effect may have a substantial effect on the speed of the transition of a signal.

From the above, one may understand that the reverse Miller effect cannot be accounted for during the characterization of the cells when generating the conventional liberty characterisation files. This is because the liberty files are generated by applying a known signal to the input of the cell under characterization with a predetermined load applied to it. This load may have a certain capacitance, but will not affect the cell in the same way that a device whose output signal is transitioning would. Thus, this will not account for a given circuit path configuration (number and type of driven cells not being known a priori). The Miller correction to the input signal depends on the path configuration; this is why this correction may only be applied when running the timing analysis of a given path.

Figure 3:
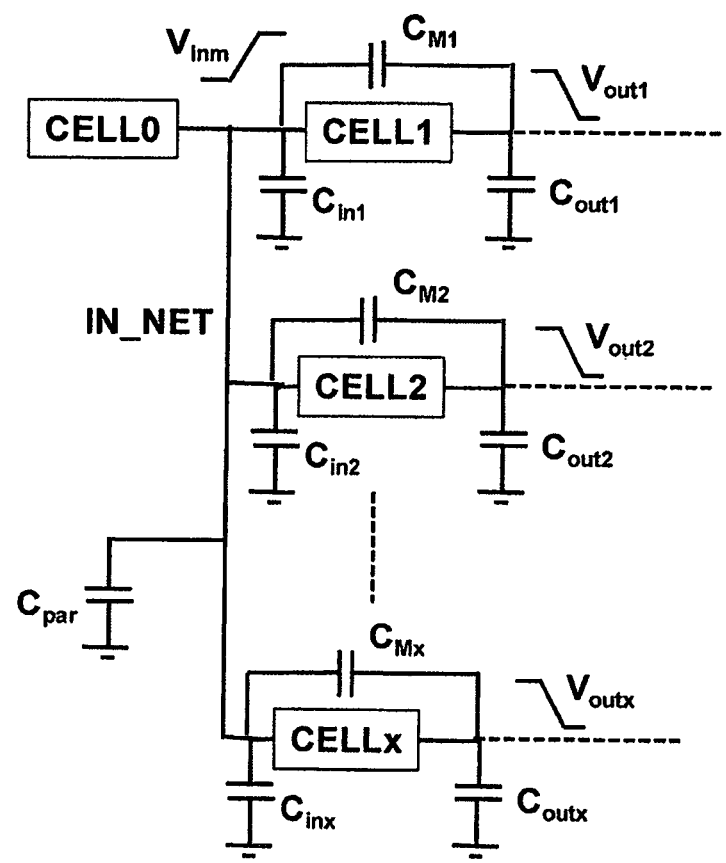

FIG. 3 schematically shows a section of an example circuit and how the Miller capacitances of the cells to which the signal is sent affect the transition of the signal. The section shown illustrates a start of a data path from cell0 to cell, and with cell2 to cellx lying in parallel with cell and being driven by the same input signal.

Each of the cells is shown with their own input capacitance an, their own output capacitance Cout and a Miller capacitance $C_M$. An additional parasitic capacitance due to other circuit components such as interconnects is shown as Cpar. In this case the input signal Vinm (which is the input signal with the Miller effect) at IN_NET delivered by CELL0 is modified by the reverse Miller effect of all the cells CELL1 to CELLx it drives and this in turn modifies the output signals Vout1 to Voutx.

An analysis of the capacitive network yields the following equation $$C\frac{dV_{inm}}{dt} = \left(C + \sum_{i=1}^{x} C_{Mi}\right)S_{in} + \sum_{i=1}^{x} \frac{C_{Mi}d(V_{outi} - V_{inm})}{dt}$$

Where C is the total capacitance seen from IN_NET and is given by the equation below $$C = C_{par} + \sum_{i=1}^{x} C_{ini}$$

And $S_{in}$ is the slew or slope of the input signal without the Miller effect.

For simplicity if one were to consider that all Miller capacitances $C_{Mi}$ are zero, then in this case the input signal without the Miller effect would be described by:

$$\frac{dV_{in}}{dt} = S_{in}$$

$S_{in}$ is a constant and $V_{in}$ is a linear waveform ($V_{inm}$, refers to $V_{in}$ with the Miller effect).

From the above equations, one can determine that the input transition time with Miller effect $\Delta T_{inM}$ can be corrected from the input transition time without Miller effect $\Delta_{in}$, using the equations given below.

As noted with respect to FIG. 2 the effect on the input transition time of the Miller effect varies depending on whether the output of the cell, or the output of the first stage for complex cells, transitions more quickly than the input or not. If cells which have outputs that transition more quickly are considered to be a first set and are denoted by j, while those that transition more slowly are considered to be a second set and are denoted by i, then an equation for correcting the transition time for the Miller effect can be derived and is given below.

$$\Delta T_{inm} = \alpha_M \Delta T_{in}$$

$$\alpha_M = 1 + \frac{\sum_{j=1}^{m} k_j + \sum_{i=m}^{x} \frac{(H - N_{vti})k_i}{R_i}}{(H - L)\left(1 - \sum_{i=m}^{x} \frac{k_i}{R_i}\right)}$$

$$k_i = \frac{C_{Mi}}{C + \sum_{i=1}^{x} C_{Mi}}$$

$$R_i = \frac{\Delta T_{outi}}{\Delta T_{in}}$$

In this regard the largest effect is felt from the cells j of the first set where the output transitions more quickly.

The terms in the equation are defined below:
$\alpha_M$ is referred to as the Miller correction factor;
H is the transition time high threshold (in %);
L is the transition time low threshold (in %);
The rising transition time is the time it takes for the signal to transition from L % to H % of the power-supply voltage Vdd. The falling transition time is the time it takes for the signal to transition from H % to L % of the power-supply voltage Vdd. typical values of L and H are 10 and 90%.
$\Delta T_{outi}$ is the output transition time of the $i^{th}$ cell (i from 1 to x) or of the first stage of the $i^{th}$ cell if it is a complex cell;
$N_{vti}$ is a factor characterizing the starting point of the output transition corresponding to the threshold voltage of the $i^{th}$ cell or of the first stage of the $i^{th}$ cell if it is a complex cell. This factor ranges between 0.1 and 0.9;
$N_{vti}$, $C_{Mi}$ and complex cells $\Delta T_{outi}$ are the only additional parameters over those conventionally supplied with a liberty file that are required to compute the Miller correction factor at each input net. $\Delta T_{in}$ and for simple cells $\Delta T_{outi}$ are already known from pre-existing .lib files.

As noted above index j applies to the cells (among CELL1 to CELLx) where the output or the first stage output of complex cells transitions more quickly than the input, that is those cells passing the following condition:

$$\Delta T_{outi} \leq \left(H + \sum_{i=1}^{x} k_i - N_{vti}\right)\Delta T_{in}$$

and index i applies to the remaining cells (among CELL1 to CELLx).

It should be clear that the above equations may be used for either a rising or falling signal, $C_{Mi}$, $N_{vti}$ and $\Delta T_{outi}$ being determined for both rise and fall transitions.

From the above it would seem that the cell output transition time could be corrected for the Miller effect using data that is already available from a conventional liberty file with additional parameters being required, which are $C_{Mi}$ for all cells, complex cell first stage $\Delta T_{outi}$ and $N_{vti}$ for cells where the output or complex cell first stage output transitions more slowly. These parameters can be extracted from additional characterization steps performed during the characterization of the cells, by using Spice simulations.

Figure 4A:
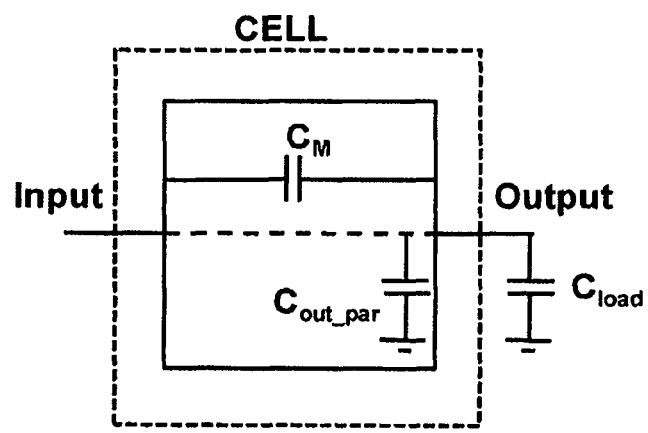

A short explanation of how these additional values are derived is given below. Complex cell first stage $\Delta T_{outi}$ is determined using the conventional characterization technique which is already used to determine the cell output transition time ($\Delta T_{outi}$ lookup tables are already part of the conventional liberty file for simple cells). As noted previously, the Miller capacitance $C_M$ is the capacitance between the input and the output of a given simple cell or between the input and the output of the first stage of a given complex cell. In FIG. 4A, the output of a given simple cell is loaded by a capacitance $C_{load}$. The cell has an intrinsic output capacitance called $C_{out\_par}$ which means that the total driven output capacitance is:

$$C_{out} = C_{out\_par} + C_{load}$$

Figure 4B:
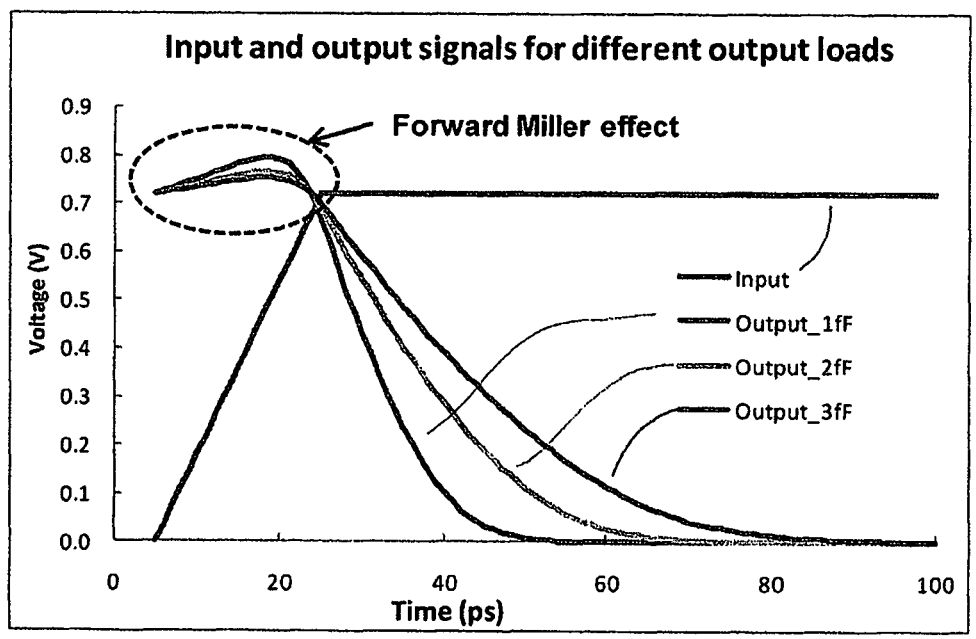

The output signal delivered by the cell when a linear voltage ramp is applied to the input of the cell is shown in FIG. 4B, for different values of load capacitance (1, 2 and 3 fF). The output signals in this example have been obtained from Spice simulations. The output signal starts to rise before the output switching occurs, this is due to the forward Miller effect. The rising input signal is fed to the output through the Miller capacitance. This portion of the output signal is used to extract the Miller capacitance. From the analysis of the capacitive network the input ($V_{in}$) and output ($V_{out}$) voltages are related by:

$$C_M \frac{d(V_{in} - V_{out})}{dt} = C_{out} \frac{dV_{out}}{dt}$$

which yields the following formula:

$$R = \frac{\frac{dV_{in}}{dt}}{\frac{dV_{out}}{dt}} = 1 + \frac{C_{out\_par}}{C_M} + \frac{C_{load}}{C_M}$$

$dV_{in}/dt$ and $dV_{out}/dt$ being the slopes of the input and output signals

Different R values are extracted for the different load values, plotting these R values as a function of $C_{load}$ yields a straight line. The slope of this straight line is $1/C_M$ from which one can determine $C_M$.

The above example applies to a rising input signal and provides the $C_M$ for a rising input signal, a $C_M$ for a falling input signal can be derived using the same method. The same method also applies to a complex cell where Vout is the first stage output signal.

Figure 5:
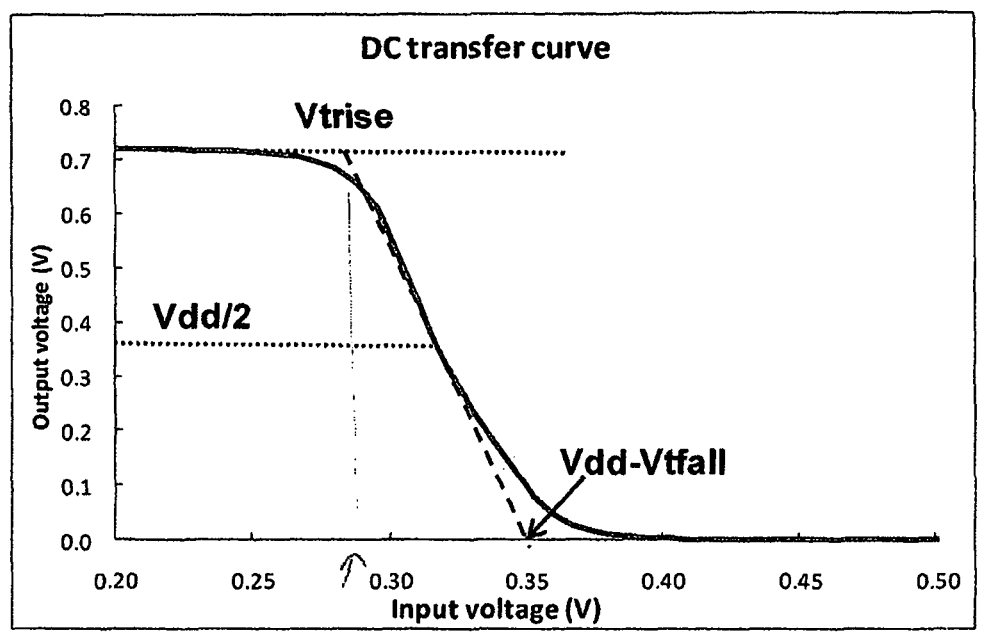

The switching threshold $N_{vt}$ can be obtained from the DC transfer curve of the simple cell or the complex cell first stage. This curve plots the variation of the output voltage when the input voltage varies. A transfer curve example is shown in FIG. 5. The threshold voltages Vtrise and Vtfall are extracted from this transfer curve using an extrapolated straight line from the centre point corresponding to Vdd/2 (Vdd is the power-supply voltage). The switching thresholds are then defined as:

$Nvtrise = Vtrise/Vdd$ and $Nvfall = Vtfall/Vdd$

The Miller capacitance and the switching thresholds must be extracted for each input of the cell. In this regard cells have been shown with only one input for reasons of simplicity, however, it is clear that some cells may have more than one input.

As noted above, in order to include these values in the characterisation file, the conventional liberty file will need modifying. One way of doing it is shown below, with the additional values shown in bold in the case of a simple cell.

```
cell(NAND2_X1M_A12TR) {
    pin(A) {
        direction : input ;
        fall_capacitance : 0.85373 ;
        Miller_fall_capacitance : 0.51 ;
        Fall_threshold_voltage_ratio : 0.25 ;
        rise_capacitance : 0.816704 ;
        Miller_rise_capacitance : 0.55 ;
        Rise_threshold_voltage_ratio : 0.30 ;
```

FIG. 6 shows schematically an example of a cell, and the data which would be included in the characterisation file of a simple cell. Thus, there would be lookup tables for the output transition times and delay times for different loads and input transition times for a rising and a falling signal, and there would be the Miller capacitances for rising and falling signals $C_M$ and the threshold voltage value for the rising and falling signal. For clarity, in the case of complex cells, the characterization file would include lookup tables for the cell output transition times and for the first stage output transition times.

With regard to the delay value this is the time it takes for a signal to pass through the cell and in some embodiments is defined as the time between the input signal reaching the halfway point in its transition to the time it takes the output signal to reach the halfway point of its transition, that is 50% of Vdd−Vss.

Figure 7:
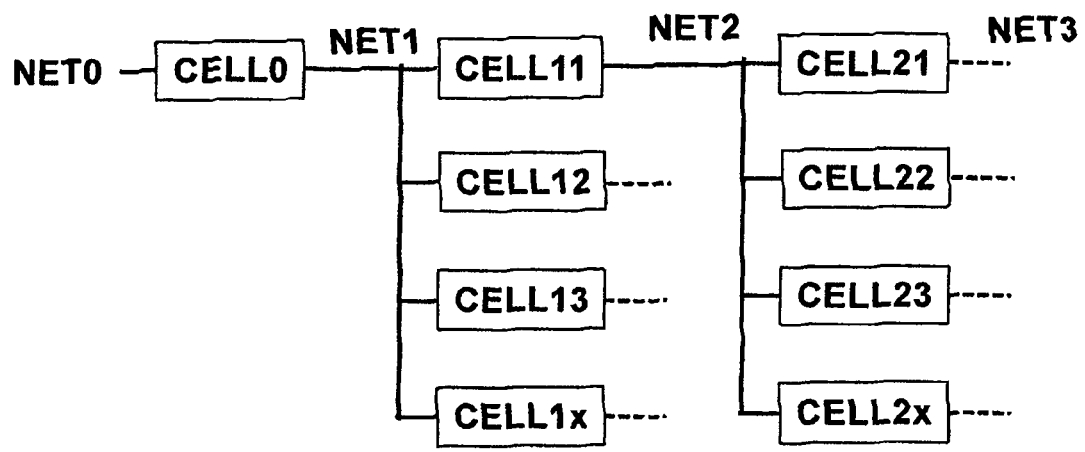
FIG. 7 shows a further section of a circuit.

FIG. 7 shows a section of a circuit comprising standard cells. To perform a static timing analysis on this section of the circuit, initially an input transition time is defined for the input of the data path under analysis NET0.

Then the characterisation file for CELL11 is used to determine the output transition time and the delay time corresponding to the input transition time and the loading on the cell using lookup tables in the characterisation file. The input transition time is then corrected for by calculating the Miller correction factor $\alpha_M$ using the information regarding the Miller capacitance and the threshold voltage factor and other information from the characterisation files for cells CELL11 . . . Cell1X (assuming that the characterisation files for these cells have this information. Where they do not no correction is performed) and a corrected output transition time and delay time are retrieved from the lookup tables using the corrected input transition time. The corrected output transition time is then used as the input transition time at NET2. In some embodiments the corrected output transition time may not be taken directly as the input transition time for the next cells, but may be amended slightly to allow for RC delays due to interconnects between the cells.

The output transition time and delay for CELL21 is then determined from the lookup tables of CELL21 using the output load at NET3 and the corrected output transition time of CELL11 as the input transition time for CELL21. The output transition time is then used along with the Miller capacitance and the threshold voltage factor to determine the Miller correction factor and the input transition time is corrected by applying the Miller correction factor and is used to retrieve a corrected output transition and delay time, the corrected output transition time beings used as the basis for the input transition time for the next cell.

When all cells have been analysed the total delay of the signal passing through the cells can be derived.

In the case that some of the cells are complex cells, then when correcting for the Miller effect, the Miller correction factor is calculated for the first inverting stage using the Miller capacitance, output transition times and threshold voltage factor for this inverting stage. In this regard the characterisation data includes output transition time lookup tables for both the first inverting stage and the complete cell. The corrected input transition time is then used to determine the output transition time and delay time for the whole cell using the lookup tables for the cell.

Figure 8:
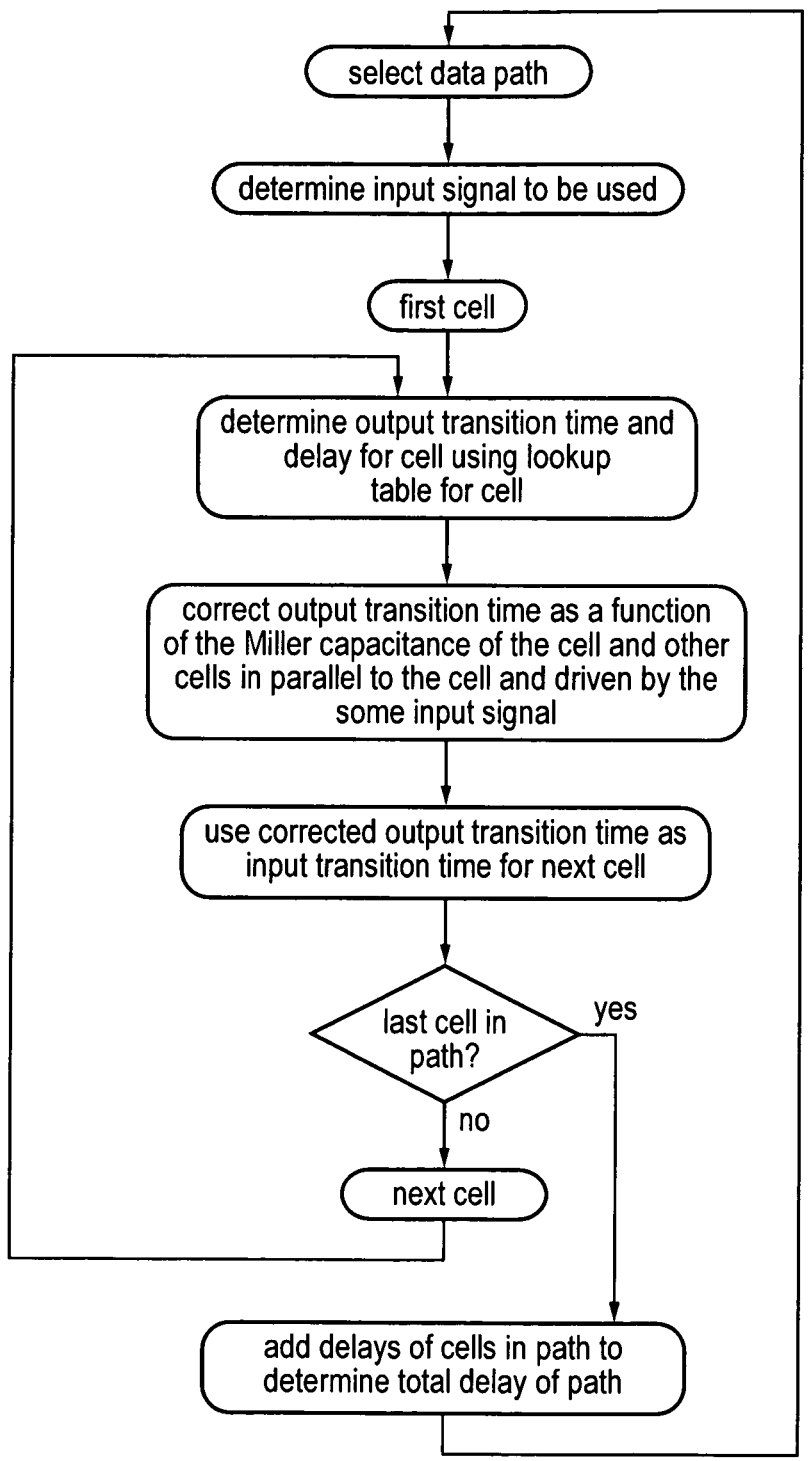
FIG. 8 shows a flow diagram illustrating steps in a method for performing a static timing analysis according to an embodiment of the present technique.

FIG. 8 shows a flow diagram illustrating steps in a method performed during a static timing analysis of the circuit that takes account of the reverse Miller effect on timing delays within the circuit. The circuit is formed of standard cells for which there are characterisation files available that include lookup tables for the output transition times and delays for the cell as a function of the input transition time and the loading on the cell and that also contain the Miller parameters for the cell. Miller parameters include the Miller capacitance, the threshold voltage ratio and for complex cells the first stage output transition times.

The static timing analysis is done for a particular path through the circuit. This may be a clock path or a data path. Thus, initially the path is selected in this example it is a data path, and it is determined what the signal to be input into this data path is. From this one can determine the input transition time for the first cell. Thus, using the lookup tables and knowledge of the circuit which will provide the loading on the cell the output transition time and delay for that cell can be determined from the lookup tables.

The input transition time determined in this way is then corrected using the Miller correction factor that can be determined as a function of the Miller parameters of the cells that are driven by the input signal and a corrected output transition time and delay time are derived from the lookup tables using the corrected input transition time. This corrected output transition time is then used as the input transition time for the next cell and if this is not the final cell in the path the same steps are performed again for the subsequent cell. In this way the output transition time and delay for subsequent cells are determined using a lookup table and the output transition and delay time are then corrected and the corrected output transition time is used as the input transition time for the next cell. When all cells in the path have been analysed then the delays for each cell are added together and the total delay of the path can be determined.

Figure 9:
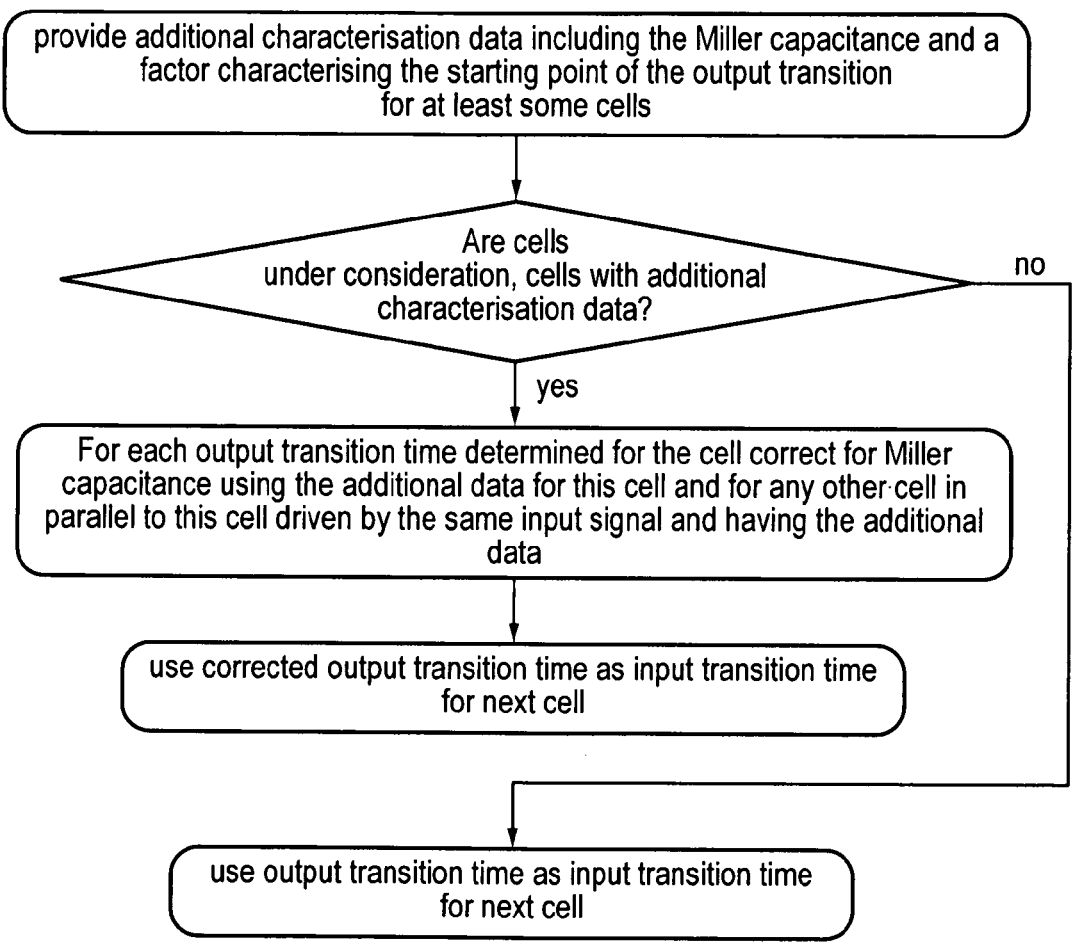
FIG. 9 shows a flow diagram illustrating steps in a method for correcting a conventional static timing analysis.

FIG. 9 shows steps in a method for correcting for a conventional timing analysis of a circuit to account for the reverse Miller effect.

Thus, in this method additional characterisation data that includes the Miller parameters is supplied for some cells. Then for each output transition time that is determined in the static timing analysis it is determined if the cell or any of the cells in parallel with it and driven by the same signal are cells for which additional characterisation data has been provided. If any of them are then the output transition time is corrected using the additional characterisation data for that cell and for other cells that are driven by the same input signal. If the cells are not cells for which the additional characterisation data has been supplied then no correction of the output transition is performed.

The output transition time or the corrected output transition time of the cell is then used as the input transition time for the next cell. In this way, cells will have their calculated transition times corrected for the Miller effect and the static timing analysis will provide a more accurate result.

Figure 10:
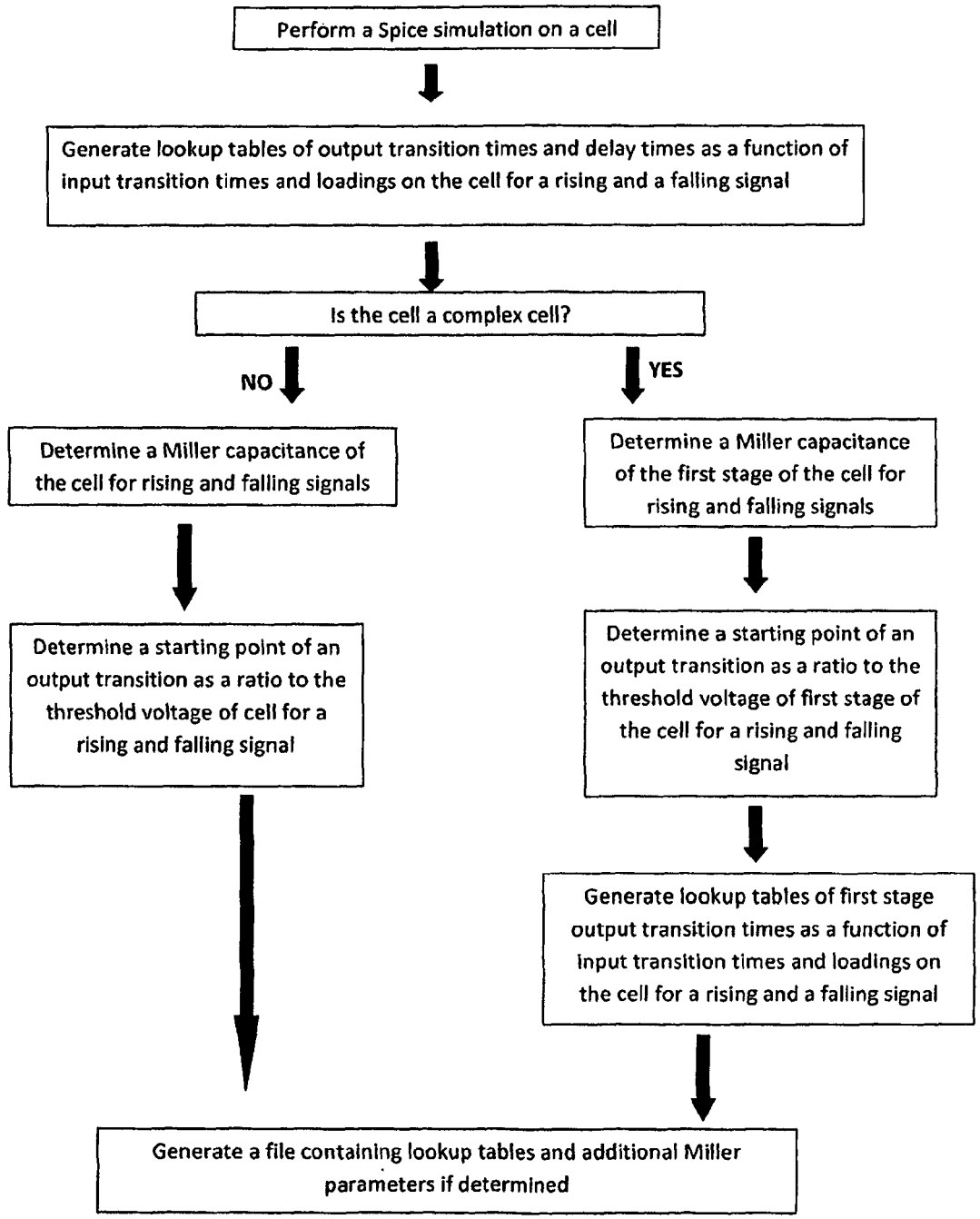
FIG. 10 shows a flow diagram illustrating steps in a method for generating characterisation files suitable for using a timing analysis that corrects for the reverse Miller effect.

FIG. 10 shows a method of generating a characterisation file according to an embodiment of the present invention. Initially a Spice simulation is performed on the cell and lookup tables of output transition times and delay times as a function of the input transition time and the loading on the cell are generated for both rising and falling signals. It is then determined whether the cell is a complex cell or not. If it is the Miller capacitance, the starting point of an output transition as a ratio of the threshold voltage and the output transition times of the first stage of the cell are determined for a rising and falling signal. If it is not the Miller capacitance and the starting point of an output transition as a ratio of the threshold voltage of the cell are determined for a rising and falling signal. A characterisation file is then generated for the cells containing lookup tables and the Miller parameters. These characterisation files are used in static timing analysis procedures such as those described in FIGS. 8 and 9 and allow for the analysis to account for the reverse Miller effect. In this way, more accurate timing analysis of circuits can be performed, without too heavy a computational burden.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. A method of correcting a timing analysis performed by a data processing apparatus on a circuit formed of a plurality of cells to account for the reverse Miller effect, said data processing apparatus having access to timing characterisation data that provides timing characteristics for each of said plurality of cells, said timing characterisation data indicating output transition times and delay times for a signal passing through said cell in dependence upon transition times of said signal and a loading on said cell, wherein said timing analysis comprises:

for a signal path:
identifying cells on said signal path and cells in parallel to said cells on said signal path that are driven by a same signal, and for each cell on said signal path, determining from an input transition time and a load on said cell, an output transition time and a delay using said characterisation data for said cell, an output transition time calculated for a first cell on said signal path being used as a basis for an input transition time for a next cell on said signal path;
wherein said correcting steps comprise:
providing further characterisation data for at least some of said cells, said further characterisation data including a Miller capacitance of at least a portion of said cell;
correcting said determined output transition time for said at least some of said cells by increasing said output transition time by an amount dependent upon said Miller capacitance for said cell and for said at least some of said cells that are in parallel to said cell and are driven by a same signal;

using said correction to said output transition time to correct an input transition time for a next cell when calculating said delay time and said output transition time for said next cell;

calculating a time taken for a data signal to travel along said signal path from said delay times determined using said corrected output transition times.

2. A method according to claim 1, wherein said step of correcting said determined output transition time for said cell comprises correcting said input transition time by an amount dependent upon said Miller capacitance for said cell and for said at least some of said cells that are in parallel to said cell and are driven by a same signal and using said corrected input transition time to determine a corrected output transition time and a corrected delay time using said characterisation data for said cell.

3. A method according to claim 2, wherein said plurality of cells further comprise at least one complex cell with multiple inverting stages, said Miller capacitance being a Miller capacitance of said first inverting stage of said cells.

4. A method according to claim 3, wherein said characterisation data for each cell comprises a file comprising delay and output transition time lookup tables for rising and for falling signals at an output of said cell and for at least some cells that are said simple cells further comprises said Miller capacitance for said cell for said rising and said falling signals and said value indicative of a threshold voltage at which a cell's output starts to transition, and for said at least some cells, where said at least some cells are complex cells further comprises said Miller capacitance for said first inverting stage of said complex cell for said rising and said falling signals and said value indicative of a threshold voltage at which a first inverting stage's output starts to transition and output transition time lookup tables for said first inverting stage.

5. A method of correcting a timing analysis according to claim 1, comprising:

providing further characterisation data for said at least some of said cells, said further characterisation data comprising a value indicative of a threshold voltage at which a predetermined output starts to transition; wherein said amount that said output transition time is increased by is dependent upon said Miller capacitance for said cell and for said at least some of said cells that are in parallel to said cell and are driven by a same signal and for a subset of said at least some of said cells said amount is also dependent upon said value indicative of said threshold voltage.

6. A method of correcting a timing analysis according to claim 5, comprising the further steps of:

determining for said at least some of said cells that are in said signal path:

whether, for said each of said at least some of said cells in said signal path and said at least some of said cells in parallel to said cell and driven by a same signal said predetermined output transition completes before said input transition, and dividing said at least some of said cells into two sets a first set comprising cells where said predetermined output transition completes before said input transition, and a second set comprising cells where said predetermined output transition completes after said input transition;

determining a contribution to said correction of said output transition time differently for said first set and said second set, said contribution from said first set depending on said Miller capacitance for said cells and said contribution from said second set depending on said Miller capacitance for said cells and said value indicative of said threshold voltage.

7. A method according to claim 4, wherein said correction for said first set of cells is dependent upon a ratio of a sum of said Miller capacitance for said cell and for said cells in parallel to said cell and driven by a same signal to a total capacitance of said circuit seen at an input to said cell.

8. A method according to claim 4, wherein said correction for said second set of cells is dependent upon a ratio of a sum of said Miller capacitance of said cell and said cells in parallel to said cell driven by a same signal to a total capacitance of said circuit seen at an input to said cell and driven by a same signal and to a difference between said transition time threshold of said signal and said value indicative of said threshold voltage at which said output starts to transition.

9. A method according to claim 1, wherein said characterisation data for each cell comprises a file comprising delay and output transition time lookup tables for rising and for falling signals and for said at least some cells further comprises said Miller capacitance for said rising and said falling signals and said value indicative of a threshold voltage at which an output starts to transition.

10. A computer program stored on a non-transitory computer readable storage medium which program, when executed on a data processing apparatus, controls said data processing apparatus to perform a method according to claim 1.

11. A method of performing a timing analysis on a processing apparatus analysing a circuit formed of a plurality of cells, said processing apparatus having access to timing characterisation data that provides timing characteristics for each of said plurality of cells, said timing characterisation data including output transition and delay times for signals in dependence upon transition times of an input signal and a loading on said cell, said timing characterisation data for at least some of said cells further comprising a Miller capacitance for said cell, wherein said method comprises the steps of:

for a signal path:

identifying cells on said signal path and cells in parallel to said cells on said signal path that are driven by a same signal, and for each of said cells on said signal path:

determining from an input transition time, and a load on said cell, a first output transition time using data from said characterisation data for said cell;

and for said at least some of said cells on said signal path for which Miller capacitance data is available correcting said input transition time for said cell by increasing said input transition time by an amount dependent upon said Miller capacitance of said cell and said at least some of said cells that are in parallel to said cell and are driven by a same signal;

using said correction to said input transition time to determine a delay time and a corrected output transition time from said characterisation data, said corrected output transition time being used as a basis for an input transition time for a next cell on said signal path;

calculating a time taken for a data signal to travel along said signal path from said delay times.

12. A method according to claim 11 wherein said plurality of cells comprise at least one simple cell with a single inverting stage, said first output transition time for said at least one simple cell being a time that it takes for a signal measured at an output of said cell to transition between two predetermined percentages of its maximum value, said input transition time for said next cell being based on said corrected output transition time.

13. A method according to claim 12 wherein said plurality of cells further comprise at least one complex cell with multiple inverting stages, said first output transition time for said at least one complex cell being a time that it takes for a signal measured at an output of a first inverting stage of said complex cell to transition between two predetermined percentages of its maximum value.

14. A method according to claim 13, wherein said characterisation data for each cell comprises a file comprising delay and output transition time lookup tables for rising and for falling signals at an output of said cell and for said simple cells further comprises said Miller capacitance for said cell for said rising and said falling signals and said value indicative of a threshold voltage at which a cell's output starts to transition, and for said at least some cells, where said at least some cells are complex cells further comprises said Miller capacitance for said first inverting stage of said complex cell for said rising and said falling signals and said value indicative of a threshold voltage at which a first inverting stage's output starts to transition and output transition time lookup tables for said first inverting stage.

15. A method of performing a timing analysis according to claim 11, wherein:
said characterisation data for said at least some of said cells includes a value indicative of a threshold voltage at which said cell's output starts to transition; wherein
said amount that said input transition time is increased by is dependent upon said Miller capacitance of said cell and said at least some of said cells that are in parallel to said cell and are driven by a same signal, and for a subset of said at least some of said cells said amount is also dependent upon said value indicative of said threshold voltage and said first output transition time.

16. A method of performing a timing analysis according to claim 15, comprising the further steps of:
determining for said at least some of said cells that are in said signal path:
whether, for said each of said at least some of said cells in said signal path and said at least some of said cells in parallel to said cell and driven by a same signal said first output transition completes before said input transition, and dividing said at least some of said cells into two sets a first set comprising cells where said first output transition completes before said input transition, and a second set comprising cells where said first output transition completes after said input transition;
determining a contribution to said correction of said output transition time differently for said first set and said second set, said contribution from said first set depending on said Miller capacitance of said cells and said contribution from said second set depending on said Miller capacitance of said cells and said value indicative of said threshold voltage.

17. A method according to claim 16, wherein said correction for said first set of cells is dependent upon a ratio of a sum of said Miller capacitance of said cell and said cells in parallel to said cell and driven by a same signal to a total capacitance of said circuit seen from an input of said cell.

18. A method according to claim 16, wherein said correction for said second set of cells is dependent upon a ratio of a sum of said Miller capacitance of said cell and said cells in parallel to said cell driven by a same signal to a total capacitance of said circuit seen from an input to said cell and to a difference between said transition time threshold of said signal and said value indicative of said threshold voltage at which said cell's output starts to transition.

19. A method according to claim 11, wherein said characterisation data for each cell comprises a file comprising transition time lookup tables for rising and for falling signals and for said at least some cells further comprises said Miller capacitance for said rising and said falling signals and said value indicative of a threshold voltage at which said cell's output starts to transition.

20. A computer program stored on a note-transitory computer readable storage medium which, when executed on a data processing apparatus, controls said data processing apparatus to perform a method according to claim 11.

21. A timing characterisation file of a standard cell for use in a static timing analysis of a circuit including said standard cell according to claim 11, said file stored on a non-transitory computer readable storage medium, wherein said timing characterisation file comprises output transition times and delay times as a function of input transition times and loads on said standard cell and Miller capacitances and threshold voltage ratios for a falling and a rising signal input to said standard cell.

22. A method of generating a timing characterisation file for a standard cell comprising the steps of:
analysing said standard cell using a processing apparatus:
determining changes in output transition times and delay times with respect to predetermined changes in loading and predetermined changes in transition input times for a rising and a falling signal at an output to said cell;
storing said changes in output transition times and delay times against said predetermined loading and transition input times for said rising and said falling signals;
determining a Miller capacitance of said cell for a rising and a falling signal;
determining a ratio of a starting point of an output transition to a threshold voltage of the cell for a rising and a falling signal; and
generating a timing characterisation file for said standard cell comprising said delays, said output transition times, said Miller capacitances and said threshold voltage ratios for said rising and said falling signals.

23. A method according to claim 22, wherein said standard cell comprises a complex cell with multiple inverting stages, said method further comprising a step of determining changes in output transition times with respect to predetermined changes in loading and predetermined changes in transition input times for a rising and a falling signal at an output of a first inverting stage of said complex cell; and
storing said changes in output transition times against said predetermined loading and transition input times for said rising and said falling signals; wherein
said Miller capacitance is said Miller capacitance of said first inverting stage.

24. A timing characterisation file for a complex standard cell generated according to the method of claim 23, said file stored on a non-transitory computer readable storage medium and comprising said output transition times and delay times as a function of input transition times and loads on said standard cell at an output of said cell and further comprises output transition time lookup tables at an output of said first inverting stage and Miller capacitances and threshold voltage ratios for a first inverting stage of said cell for a falling and a rising signal input to said standard cell.

25. A method of generating a timing characterisation file according to claim 22, wherein said timing characterisation file is a liberty file for use in static timing analysis of a circuit that includes said standard cell and said output transition times and delay times are stored in lookup tables within said liberty file.

26. A timing characterisation file for a standard cell generated according to the method of claim 22, said file stored on a non-transitory computer readable storage medium and comprising said output transition times and delay times as a function of input transition times and loads on said standard cell and Miller capacitances and threshold voltage ratios for a falling and a rising signal input to said standard cell.

* * * * *